United States Patent [19]

Sihon

[11] Patent Number: 5,364,109
[45] Date of Patent: Nov. 15, 1994

[54] SEALING GASKET WITH HARD INTERIOR BACKBONE AND INTEGRAL CRUSH LIMITERS

[75] Inventor: Tanas M. Sihon, Monroe, Mich.

[73] Assignee: Chrysler Corporation, Highland Park, Mich.

[21] Appl. No.: 976,096

[22] Filed: Nov. 13, 1992

[51] Int. Cl.5 .............................................. F16J 15/12
[52] U.S. Cl. ........................................ 277/9; 277/180; 277/235 B
[58] Field of Search ................. 277/9, 180, 233, 235 B

[56] References Cited

U.S. PATENT DOCUMENTS

| | | | |
|---|---|---|---|
| 3,053,544 | 9/1962 | Gorsica | 277/180 |
| 3,231,288 | 1/1966 | Hensieu | 277/180 X |
| 4,196,913 | 4/1980 | Oka | 277/235 B |
| 4,813,691 | 3/1989 | Schoenborn | 277/235 B |
| 4,867,461 | 9/1989 | Shimmell | 277/180 X |
| 5,080,379 | 1/1992 | Zimmerman et al. | 277/235 B X |
| 5,118,121 | 6/1992 | Hellman, Sr. | 277/180 X |
| 5,131,668 | 7/1992 | Uchida | 277/180 X |
| 5,193,822 | 3/1993 | Bonell et al. | 277/180 |

FOREIGN PATENT DOCUMENTS

| | | | |
|---|---|---|---|
| 3831413 | 4/1990 | Germany | 277/235 B |
| 836584 | 6/1960 | United Kingdom | 277/235 B |

Primary Examiner—Scott W. Cummings
Attorney, Agent, or Firm—Kenneth H. MacLean

[57] ABSTRACT

A gasket for sealing the connection between a cylinder head and a valve cover. The gasket has a sheet metal backbone having a main body with spaced stations having holes therethrough for cap screws fastening a valve cover to a cylinder head. A finger-like tab extends inwardly from the stations. Each tab has a cap screw hole at the distal end thereof. The tabs are bent back over the main body so as to be in contact with the spaced stations and with the holes in the tabs and stations in alignment. The backbone has a rubber based material subsequently molded therearound. The result of the folded construction is a double thickness of metal in the areas surrounding the cap screw holes to form positive stops to limit the compression loads applied to the rubber based seal of the gasket by the cap screws when the valve cover is fastened to the cylinder head. The compression loads are thereby limited and the gasket is protected from damage by excessive loads so that effective sealing and long service life is assured.

3 Claims, 2 Drawing Sheets

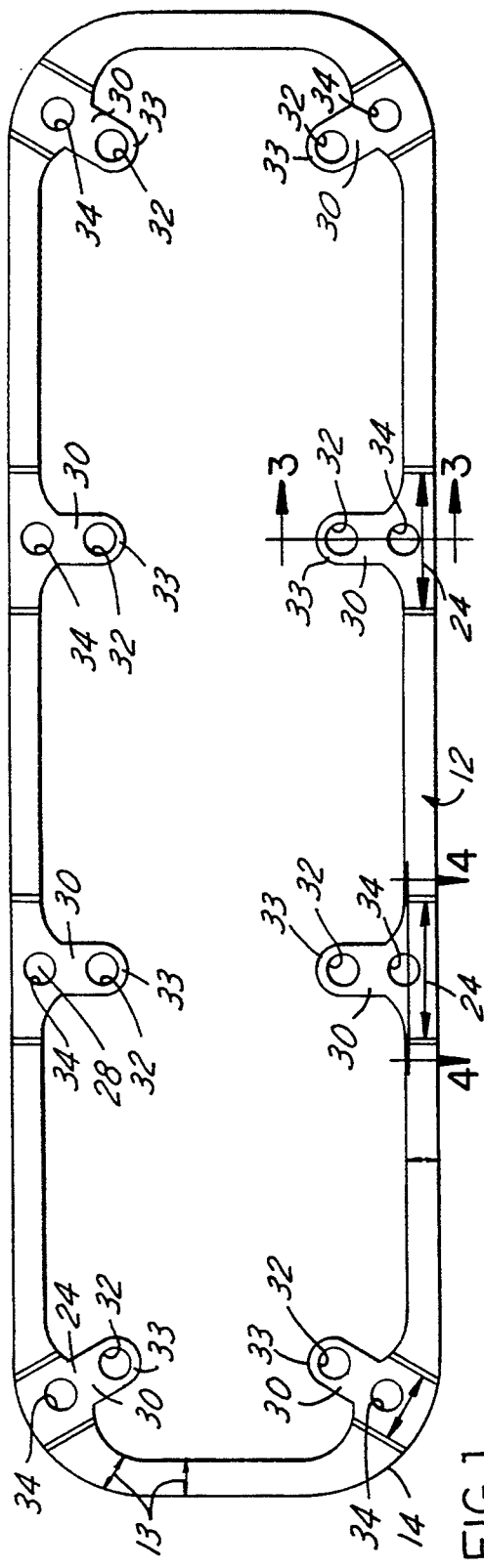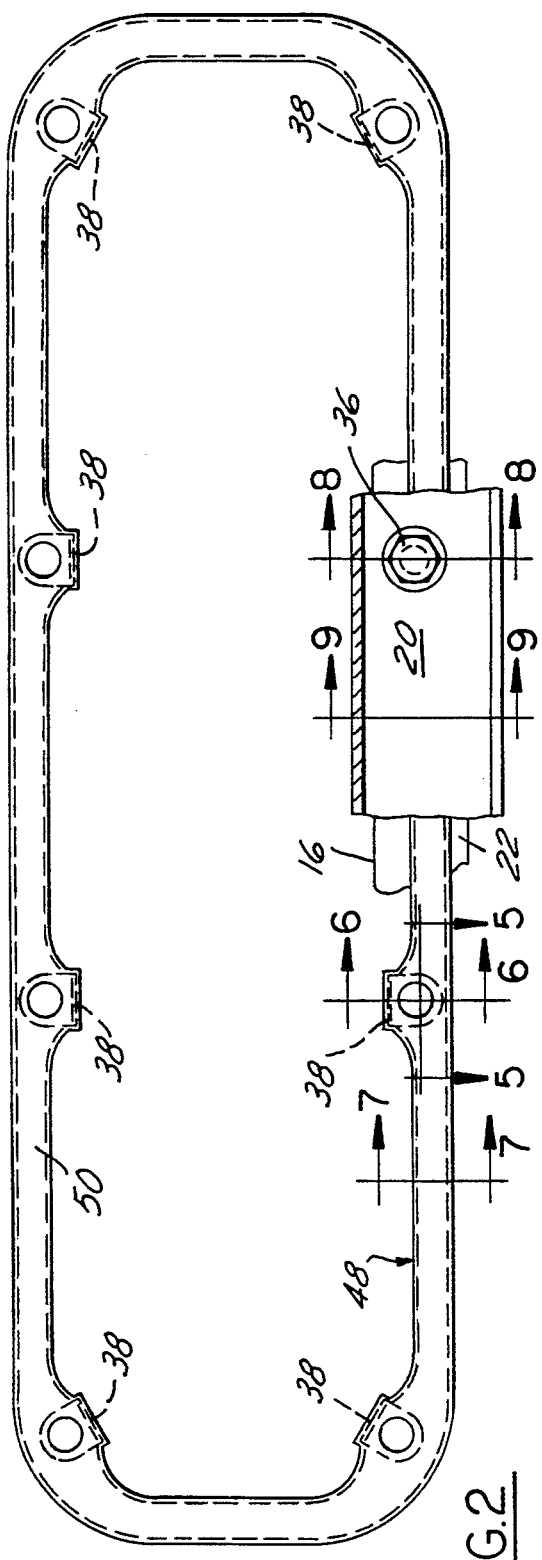

5,364,109

SEALING GASKET WITH HARD INTERIOR BACKBONE AND INTEGRAL CRUSH LIMITERS

FIELD OF THE INVENTION

This invention relates to seals, and more particularly, to sealing gaskets having a sealing material surrounding a hard interior backbone with integral compression limiting structure.

DESCRIPTION OF RELATED ART

Prior to the present invention, various gasket constructions have been engineered with stop mechanisms to eliminate excessive loads when the gasket is interposed between two members rigidly secured to one another by fasteners such as cap screws. Such stops limit the compressive loading of the gasket so that it is not distorted or damaged resulting in leaks of fluid, or other matter, after the parts have been joined together. Examples of such construction are U.S. Pat. No. 2,739,001 to Chiles Jr. for GASKETS WITH STOPS THEREIN, and U.S. Pat. No. 4,655,463 to Inciong et al. for GASKET ASSEMBLY FOR OIL PAN VALVE COVERS AND THE LIKE.

SUMMARY OF THE INVENTION

The present invention is of the general nature of the prior patents identified above, but further incorporates compression limiters integral with the backbone element of the gasket that is encased in a fluid sealing material. More particularly, the present invention is exemplified by a gasket assembly comprising a generally flat backbone of sheet metal material that has a main body generally rectangular with rounded corners to define particular sized openings for connection of constructions which are to be sealed in a fluid tight manner.

The main body has integral finger-like tabs that extend from predetermined stations in the wall of the main body into the opening defined thereby. The distal end portion of each of the tabs has a circular hole punched, or otherwise formed therein, so that when each of the tabs is reversely folded to contact and lay atop the flattened wall portion of the main body, the hole therein aligns with a corresponding hole in the wall portion of the main body.

By this arrangement, a double thickness of metal is provided with an opening therethrough that has a depth equal to a double thickness of the backbone. The surrounding material defining the fastener holes in the backbone forms a compression limiter construction.

After the core has been formed with the tabs folded, as described, a rubber compound or a thermoplastic elastomer or other suitable sealing material is molded or otherwise formed around the core so that the gasket has a substantially uniform thickness with built-in stops to limit gasket "crush", or compression loads, when the gasket is interposed between two components that are to be joined by threaded fasteners with effective fluid sealing therebetween. More particularly, this effectively eliminates, or reduces, cold flow of the sealing material from the sealing area and prevents damage thereto, and ensures that the gasket is equally loaded throughout the extent thereof and has long service life. The gasket assembly can be of any configuration to match the particular installation required. The fastener holes are aligned to support and guide the threaded fasteners into the threadedly tapped holes in the cylinder head.

The invention further provides a fluid sealing gasket assembly of substantially constant width throughout the extent thereof which has a hand frame-like backbone with tabs which are reversely bent as with fastener hole alignment to provide crush limiting construction. The gasket sealing material, rubber or thermoplastic elastomer molded or otherwise formed completely around the backbone provides for improved seal.

These and other features, objects and advantages of this invention will become more apparent from the following detailed description and drawing in which:

BRIEF DESCRIPTION OF THE DRAWINGS

FIG. 1 is a top view of the backbone of the gasket assembly of one embodiment of this invention as stamped, or otherwise formed, from sheet metal stock;

FIG. 2 is a top view of the gasket assembly of this invention, as installed between a cover plate and cylinder head partially shown, having portions of the core bent to overlay the main body thereof and covered with a rubber sealing compound;

DESCRIPTION OF THE PREFERRED EMBODIMENTS

Figure 3:
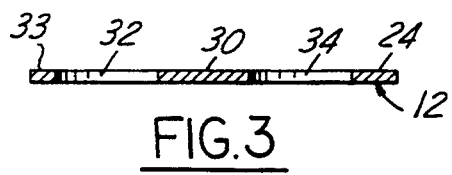
FIG. 3 is a cross-sectional view of the gasket core taken along sight lines 3—3 of FIG. 1.
Figure 4:
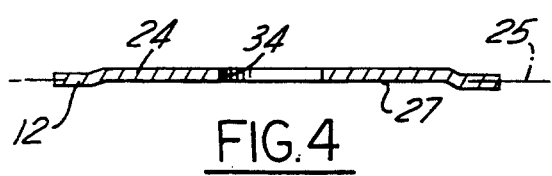
FIG. 4 is a cross-sectional view of the gasket assembly taken along sight lines 4—4 of FIG. 2.

Turning now in greater detail to the drawings, there is shown in FIG. 1 a gasket backbone 10 blanked from a sheet of steel, or other suitable material, of a predetermined thickness range. The backbone has a generally rectangular and flattened main body 12 with top and bottom sides and has a range of widths 13 and rounded corners 14 and defines an inner opening 16 that corresponds to the opening between a cover 20 and cylinder head 22 of an internal combustion engine.

Spaced portions or stations 24 of the main body 12 of the backbone are however offset from the horizontal plane of the main body 12 by a measure approximately equal to the thickness of the main body so that when the backbone is covered with a sealant material, the resulting gasket assembly will have a constant thickness throughout its extent as will be further described.

Extending in the same plane as the offset portions 24 and along linear axes 26, radiating from predetermined center points 28 in the offsets 24 of the main body are a plurality of spaced tabs 30 that are stamped, or otherwise formed, as integral parts of the backbone 10. The tabs are finger-like projections that project into the opening 16 and have circular holes 32 punched in the distal end portions 33 thereof. provided by the reversely bent tabs 30 and the offset portion 24 forms an integral stop for threaded fasteners.

Figure 6:
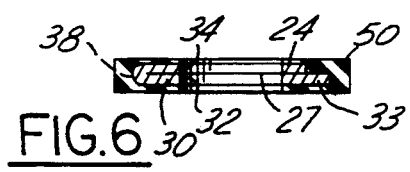
FIG. 6 is a view partly in cross-section taken generally along sight lines 6—6 of FIG. 2 showing a portion of a valve cover secured to an engine cylinder head with the gasket assembly secured therebetween.
Figures 5, 5A:
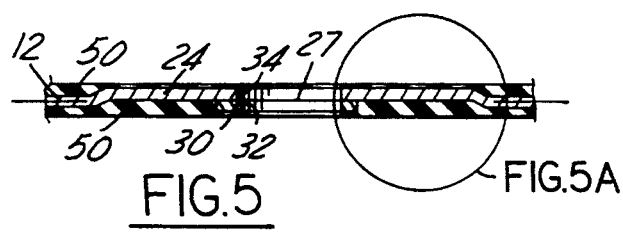
FIG. 5 is a cross-sectional view of the gasket assembly taken along sight lines 5—5 of FIG. 2.
Figure 5A:
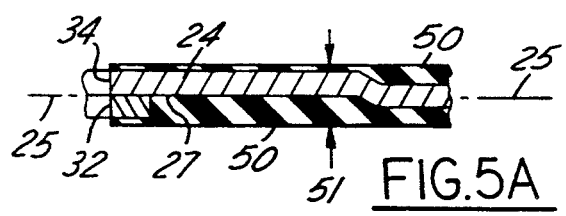
Figure 7:
FIG. 7 is a view partly in cross-section taken generally along sight lines 7—7 of FIG. 2.
Figure 8:
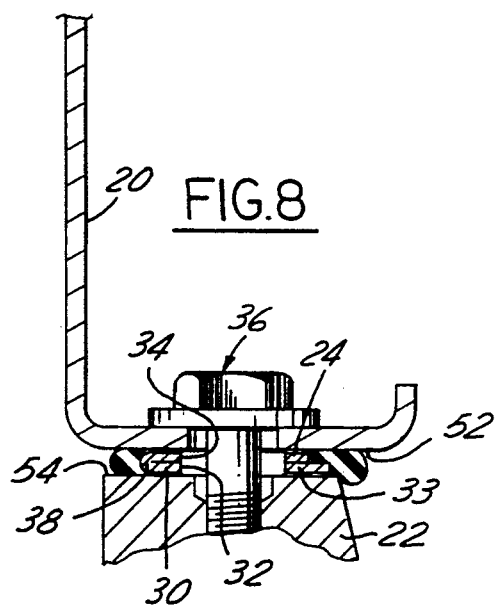
Figure 9:
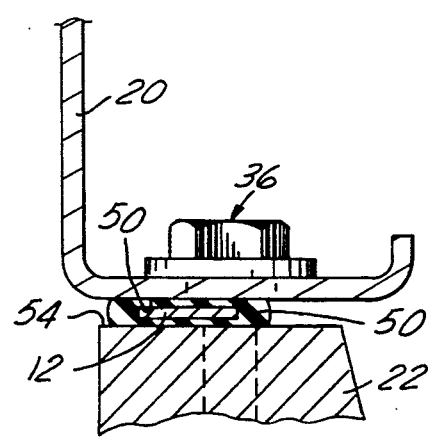

This is best shown in FIGS. 6 and 7, wherein the threaded fasteners provided by cap screws 36 have been torqued to a positive stop point in FIG. 6 as provided by the doubled thickness of the tabs and offset portions of the main body to limit the compression stressing of the gasket, and particularly, the stressing of the rubber compound seal so that the bulk modulus or cold flow of the rubber compound out of sealing engagement with the interfacing surfaces 52, 54 is limited. With the integral compression limiting stops, the cap screws can be installed quickly into the aligned openings provided in the cover 20, cover gasket 48 and cylinder head 22 with assurance that the compression loading of the gasket is limited by the built-in stops and the gasket. This predetermined and limited compression effectively seals the cover to the cylinder head without excessive cold flow, splitting, or otherwise, damaging the gasket.

The finished gasket assembly is a unified component preferably with all edges and surfaces covered to facilitate handling. The fastener holes being of double thickness of backbone metal provides better support and alignment for the fasteners and ensures that the fastener is installed without cross threading and that the gasket is installed with constant compression loads all around the perimeter of the opening for long service life.

While a preferred embodiment of the invention has been shown and described, other embodiments will now become apparent to those skilled in the art. Accordingly, this invention is not to be limited to that which is shown and described but by the following claims.

What is claimed is:

1. A gasket assembly for fluid sealing the interfacing surface areas of two components to be joined together under compression loads by fasteners, said gasket assembly having a backbone of metallic material, said backbone including a main body with top and bottom sides disposed primarily in a first plane, the improvement comprising a plurality of stations in said main body spaced from one another and offset from said first plane, a fastener receiving hole formed in each of said stations, tab means integral with said main body and associated with each of said stations and extending therefrom, each of said tab means having an end portion and having a fastener receiving hole near the end portion thereof and having a reverse bend therein so that the end portion of each said tab means closely overlies at least a portion of said associated station of said main body and so that the fastener receiving hole therein is in substantial alignment with the corresponding fastener hole in said station and elastomer sealing means molded on said main body of said backbone to sealingly cover said backbone including said spaced stations and said tab means whereby said tab means and said spaced stations of said main body cooperate to provide stop means for limiting the compression loads applied to said gasket assembly by the fasteners that extend through the holes in the gasket assembly when connecting the two components together while said elastomer sealing means is operative to cover the top and bottom sides of said body and said stations and said tab means to seal the interfacing surfaces of the two components.

2. The gasket assembly of claim 1 above, wherein said gasket assembly is of substantial uniform thickness throughout the extent thereof, and wherein said main body defines a central opening and said tab means projects from said associated stations into said central opening and whereby said tab means are reversely bent so that said holes therein axially align with the holes in the stations of main body and said backbone including said tab means with said reverse bend is completely encased by said elastomer sealingly means.

3. A gasket assembly for fluid sealing the interfacing surface areas of two components to be joined together under compression loads by fasteners, said gasket assembly having a backbone of hard stock material, said backbone including a main body with top and bottom sides extending primarily in a first plane, said main body having a plurality of fastener receiving holes formed in predetermined stations thereof, the improvement comprising a plurality of tab means integrally formed with the main body and extending from associated predetermined station thereof, each of said tab means having a fastener receiving hole near the end portion thereof and having a reverse bend therein so that the end portion of each said tab means closely overlies at least a portion of said associated predetermined station of said main body and the fastener receiving hole therein is in general alignment with the corresponding fastener hole in said predetermined stations, and sealing means disposed on said main body of said backbone to cover the sides thereof including at least an end portion of the tab means whereby said tab means and said predetermined stations of said main body provide stop means for limiting the compression loads applied thereto by the fasteners that extend through the holes in the gasket assembly to connect the two components together while said sealing means is operative to seal the interfacing surfaces of the two components, said predetermined stations being offset from the first plane of said main body by a predetermined dimension and wherein said portions of said tab means lie in said offset portion so that the thickness of said backbone defining said aligned holes is double the thickness of said main body and wherein said sealing means comprises an elastic rubber-like material which encases said backbone so that said gasket assembly has a substantially equal thickness throughout the extent thereof.

* * * * *